United States Patent
Arlon et al.

(10) Patent No.: US 7,029,154 B2
(45) Date of Patent: Apr. 18, 2006

(54) MOTOR VEHICLE HEADLIGHT AND FRANGIBLE SUPPORT

(75) Inventors: Philippe Arlon, Bobigny Cedex (FR); Laurence Marechal, La Verriere Cedex (FR); Pascal Harand, La Verriere Cedex (FR); Jean-Paul Ravier, St Andre (FR)

(73) Assignee: Valeo Vision, Bobigny Cedex (FR)

( * ) Notice: Subject to any disclaimer, the term of this patent is extended or adjusted under 35 U.S.C. 154(b) by 180 days.

(21) Appl. No.: 10/665,197

(22) Filed: Sep. 16, 2003

(65) Prior Publication Data

US 2004/0125584 A1    Jul. 1, 2004

(30) Foreign Application Priority Data

Sep. 20, 2002    (FR)    .................... 02 11708

(51) Int. Cl.
*B60Q 1/00* (2006.01)
*B60Q 1/26* (2006.01)
*B60Q 1/32* (2006.01)
*B60Q 11/00* (2006.01)
*B60Q 3/00* (2006.01)

(52) U.S. Cl. .............. 362/507; 362/21; 362/496; 362/505; 362/549; 362/390; 296/187.09

(58) Field of Classification Search ................. 362/21, 362/368–369, 390, 459, 487, 496, 505–507, 362/549; 296/187.07, 187.09
See application file for complete search history.

(56) References Cited

U.S. PATENT DOCUMENTS

| | | | | |
|---|---|---|---|---|
| 4,213,644 A | * | 7/1980 | Scrivo et al. | 362/505 |
| 4,387,920 A | * | 6/1983 | Slaughter et al. | 362/505 |
| 4,475,148 A | * | 10/1984 | Tomforde | 362/549 |
| 4,996,634 A | | 2/1991 | Haneda et al. | |
| 5,597,232 A | * | 1/1997 | Ohashi et al. | 362/265 |
| 6,190,030 B1 | * | 2/2001 | Chase | 362/549 |
| 6,450,676 B1 | * | 9/2002 | Maeda et al. | 362/549 |
| 6,471,386 B1 | * | 10/2002 | Oh | 362/549 |
| 6,478,456 B1 | * | 11/2002 | Eichhorn et al. | 362/369 |
| 2001/0022729 A1 | * | 9/2001 | Maeda | 362/487 |
| 2003/0142503 A1 | * | 7/2003 | Ericsson et al. | 362/487 |

FOREIGN PATENT DOCUMENTS

| | | |
|---|---|---|
| EP | 0620137 A | 10/1994 |
| EP | 1059200 A | 12/2000 |
| EP | 1127739 A | 8/2001 |
| FR | 2501334 | 9/1982 |
| FR | 2781736 A | 2/2000 |
| FR | 2789028 A | 8/2000 |

OTHER PUBLICATIONS

French Preliminary Search Report dated Jun. 6, 2003.

* cited by examiner

*Primary Examiner*—Stephen Husar
*Assistant Examiner*—Jason Han
(74) *Attorney, Agent, or Firm*—Morgan & Finnegan, LLP (57) ABSTRACT

The invention relates to a motor vehicle headlight, which comprises a casing enclosing a light source and fixed on a chassis, as well as frangible means of linking the casing to the chassis, which are able to absorb in the course of their rupture at least part of the energy of an impact suffered by the headlight.

25 Claims, 8 Drawing Sheets

MOTOR VEHICLE HEADLIGHT AND FRANGIBLE SUPPORT

FIELD OF THE DESCRIPTION

The present invention relates to a motor vehicle headlight, which comprises a casing enclosing at least one light source and fixed to a chassis.

BACKGROUND OF THE INVENTION

It is known that headlights, on account of their location, play a major role in the passive safety of vehicles, since during an accident in which a pedestrian is involved, the latter frequently strikes one of the headlights of the vehicle.

In the case of an adult pedestrian of average size, the part of the body coming directly into contact with the headlight is the hip, this possibly having serious consequences on the functioning of the lower limbs.

In the case of a child, it is his or her head that strikes the headlight. It is unnecessary to detail the consequences which may ensue.

Conscious of these problems, manufacturers have, already for some time now, proposed solutions aimed at reducing the injuries suffered by individuals in the event of an impact with a headlight.

Reference may in particular be made to French patent No. FR-2 501 334, or to its American equivalent U.S. Pat. No. 4,475,148.

Reference may also be made to the German patent application published under the number DE-100 30 373.

The solutions described by these documents propose that elastic means for absorbing part of the energy of the impact be interposed between the headlight and the structure of the vehicle.

These solutions have enjoyed some commercial success, but they nevertheless have a certain number of drawbacks.

On the one hand, the safety that they guarantee to the pedestrian can be enhanced, in particular, in relation to the new standards in regard to passive safety, which are defined by bodies such as the EEVC (European Enhanced Vehicle-Safety Committee) or the Euro NCAP (European New Car Assessment Program).

It must be recognized that these standards, regarding which these bodies may be consulted directly, are extremely demanding.

On the other hand, the known solutions are rather complex and involve, for the most part, a thorough revision of the general design of the headlight. This requires relatively considerable human, technical, and financial means, as well as giving rise to fine-tuning schedules that are often incompatible with the demands of automobile manufacturers.

Furthermore, the known headlights are rather bulky, and this may prove to be incompatible with the room available under the hood of the compact vehicles that represent the major part of the market share.

The invention is aimed in particular at alleviating the aforesaid draw backs of the known headlights. In satisfying the new passive safety standards, by proposing a headlight which is both compact and of relatively simple design, and while meeting the usual demands in terms if lighting and esthetics, improves the safety of pedestrians in the event of an impact.

SUMMARY OF THE INVENTION

For this purpose, the invention proposes a motor vehicle headlight, which comprises a casing enclosing a light source and fixed on a chassis, as well as frangible means of linking the casing to the chassis, which are able to absorb in the course of their rupture at least part of the energy of an impact suffered by the headlight.

Within the sense of the invention, the term headlight is understood more generally to mean any vehicle lighting/signaling device.

Hence, a thorough revision of the structure of the headlight is not necessary, thus enabling substantial savings to be made.

Moreover, such a headlight is of equivalent bulkiness to that of a conventional headlight devoid of energy absorption means.

1. It is possible to optimize the energy absorption by furnishing the linking means with at least one predetermined rupture zone or, preferably, with a succession of predetermined rupture zones capable of breaking successively during an impact suffered by the headlight, said zones being in particular adjacent to one another.

According to one embodiment, the linking means comprise a brace interposed between the casing and the chassis, furnished with a series of collars capable of breaking successively as a result of the bearing of the casing.

According to another embodiment, the linking means comprise, on the one hand, a fixing cleat. One end or zone of which is able to recoil in the event of an impact, and in particular, by successive steps, in a discrete manner, in particular in a runner. On the other hand, the linking means comprise a row of stops able to be broken successively by said end/zone of the cleat during an impact suffered by the headlight. (Preferably, during normal use, said end or zone is not movable in the element of runner type).

Preferably, these various types of frangible elements will be able to absorb the major part of the energy generated by the impact.

The cleat can be carried by the chassis, whereas the runner and the stops can be carried by the casing. More precisely, the stops are for example formed by partitions projecting from the casing, whereas the cleat is for example an add-on piece.

As a variant, the linking means may comprise a fixing member able to tear under the effect of an impact suffered by the headlight.

This fixing member comprises for example two parts fixed respectively to the casing and to the chassis, the parts being connected by a series of frangible bridges capable of breaking under the effect of a traction exerted on one of the parts.

According to one embodiment, the two parts are connected by two parallel series of frangible bridges.

Moreover, the casing can comprise means for guiding its own displacement with respect to the chassis during the rupture of the frangible bridges. These guiding means form for example a pivot link between the casing and the chassis.

According to another variant, the linking means comprise a functional member of the vehicle, such as an air filter or a screen washer liquid reservoir.

The invention will be better understood on reading the description which follows, given merely by way of example and while referring to the appended drawings in which:

DESCRIPTION OF THE PREFERRED EMBODIMENTS

Figure 1:
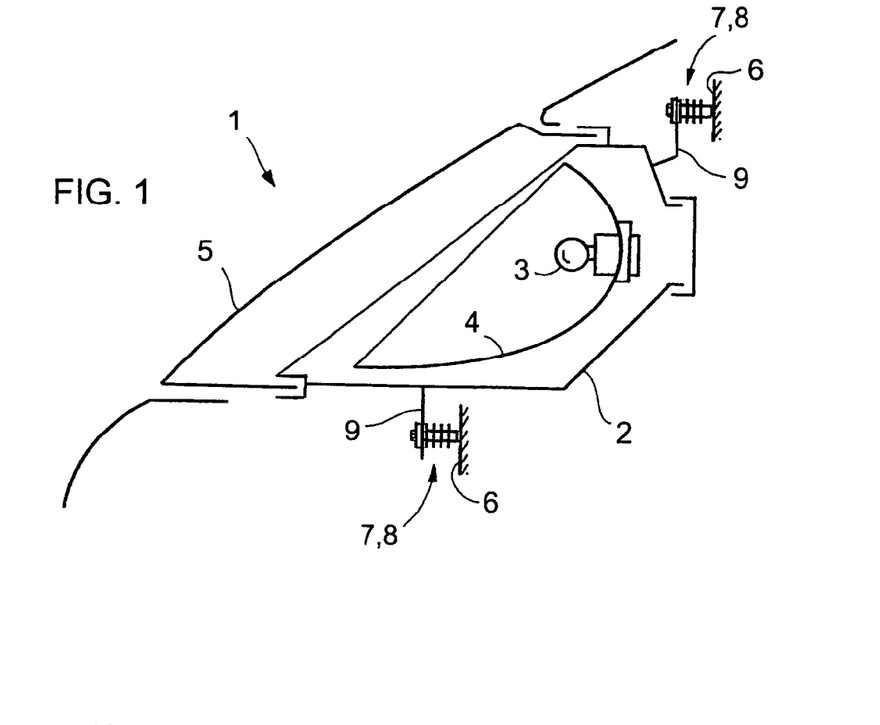
FIG. 1 is a sectional diagrammatic elevation view of a motor vehicle headlight, furnished with frangible means of linking its casing to the chassis of the vehicle, according to a first embodiment where these means comprise a brace furnished with a series of collars capable of breaking successively under the effect of an impact suffered by the headlight.

Represented in FIG. 1 is a motor vehicle headlight 1. This headlight 1 comprises a casing 2 enclosing a certain number of internal components, among which are a light source 3 and a reflector 4 which is intended to diffuse the light emitted by the source 3.

The headlight 1 furthermore comprises a transparent glass shield 5, mounted on the casing 2 which it encloses in the manner of a cover so as to protect the internal components 3, 4 while transmitting the light emitted by the source 3.

The casing 2 is fixed on a chassis 6 integrated with the chassis of the vehicle. During a frontal impact with an obstacle, such as a pedestrian, the latter will strike the glass shield 5, depressing the headlight 1.

So as in particular to limit the injuries suffered by the pedestrian, the headlight 1 comprises means suitable for absorbing at least part of the energy of the impact, and which consists of frangible means 7 of linking the casing 2 to the chassis 6. As we shall see hereinafter, these linking means 7 comprise at least one predetermined rupture zone.

Several embodiments may be chosen for the linking means 7.

Figure 2:
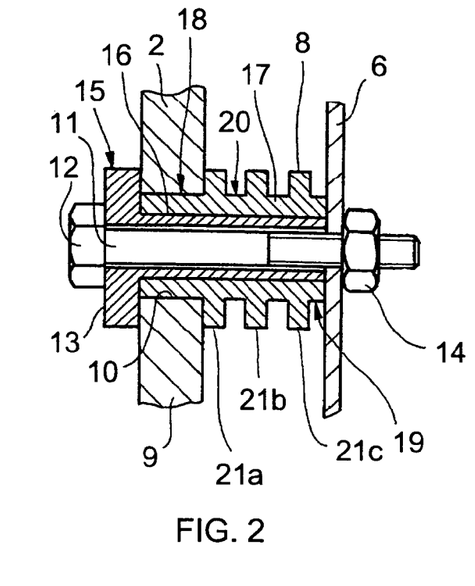
FIG. 2 is a sectional detail elevation view partially illustrating the headlight of FIG. 1, with the brace—still intact—interposed between the casing of the headlight and the chassis.
Figure 3:
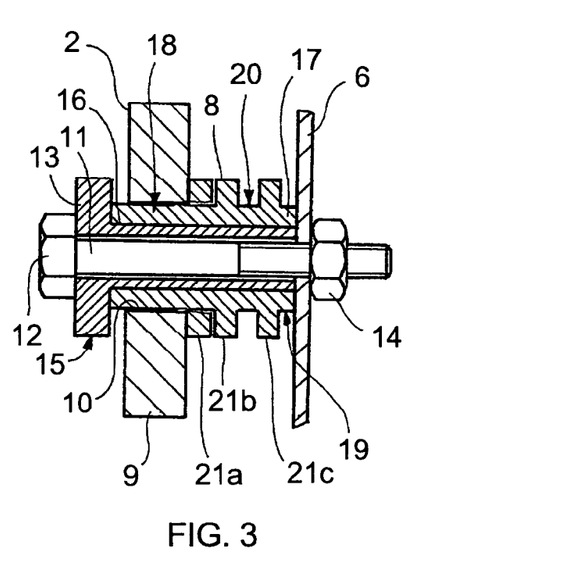
FIG. 3 is a view similar to FIG. 2, representing the headlight in the course of an impact, the casing successively breaking collars of the brace.

According to a first embodiment, illustrated in FIGS. 1 to 3, the linking means 7 comprise a brace 8 (of approximately annular form) interposed between the casing 2 and chassis 6.

More precisely, the casing 2 is furnished with projecting cleats 9 via which it is fixed to the chassis 6. Each cleat 9 is drilled with a hole 10 into which is inserted a screw 11 whose head 12 bears on the cleat 9 by way of a washer 13 playing a role of brace, the screw 11 engaging moreover with a thin wall of the chassis 6, a nut 14 being screwed onto the screw on the other side of the wall of the chassis 6 so as to keep the whole tight.

As is apparent in FIGS. 2 and 3, the washer 13 is formed by the collar of an axisymmetric piece 15 of T-shaped cross section which, to consolidate the assembly, comprises a cylindrical sheath 16 into which is inserted the screw body and onto which the brace 8 is fitted.

The latter comprises a shank 17 exhibiting a first cylindrical end portion 18 via which the shank 17 is inserted into the hole 10 of the cleat 9, and an opposite, second cylindrical end portion 19 via which the shank 17 bears against the chassis 6.

The shank 17 further exhibits, between its end portions 18 and 19, an intermediate portion 20 from which a series of regularly spaced circular annuli or collars 21a, 21b, 21c project radially.

The number of collars 21a, 21b, 21c, here chosen equal to three, is preferably between 2 and 5. However, a single collar could possibly suffice, for impacts of low amplitude.

As is apparent in FIG. 2, the collar 21a which adjoins the first end portion 18 is hard up against the cleat 9 which is thus clamped tight between the washer 13 and the collar 21a when mounting is carried out.

Thus, as long as the headlight 1 suffers no impact, the casing 2 is fixed rigidly to the chassis 6, while being kept at a constant distance from the latter by the brace 8.

This gap is kept constant as long as the force exerted on the collar 21a by the casing 2 does not exceed a predetermined threshold value, which depends on the thickness of the collar 21a and on the nature of the material chosen for the brace 8, which is made from a metal such as steel.

By way of indication, the length of the intermediate portion 20 with collars 21A, 21B, 21C is between 20 mm and 150 mm, preferably between 20 mm and 50 mm. More generally, this indication of length may be applied to the succession of frangible elements of all the embodiments described in the present text.

When in the course of an impact suffered by the headlight 1 and the force exerted by the casing 2 on the collar 21a exceeds a threshold value, the bearing of the cleat 9 against the collar 21a causes, at the junction of the latter and of the shank 17, the appearance of a shear stress that causes the tearing of the collar 21a (cf. FIG. 3). The rupturing of which absorbs at least part of the energy of the impact.

If the residual energy is sufficient, this situation reoccurs with the next collar 21b, against which the collar 21a which has just broken will abut and which is driven by the casing 2 in the direction of the chassis 6, so that part at least of the residual energy is further absorbed.

The successive rupturing of the collars 21a, 21b, 21c occurs, on account of the bearing of the casing 2, until the entire energy of the impact has been absorbed, or else until the collars 21a, 21b, 21c have all broken.

Thus, in the event of an impact, the headlight 1 recoils in a discrete manner, that is to say in jerks, toward the chassis 6.

In order to boost the energy absorption capabilities of the brace 8, it is sufficient to increase the number of collars 21a, 21b, 21c. However, raising the number of collars brings about a lengthening of the brace 8, and hence a weakening of the holding of the casing 2 on the chassis 6. In this instance, a metal brace 8 with three collars 21a, 21b, 21c has been chosen which, while exhibiting a large energy absorption capability, also affords sufficiently rigid holding of the casing 2 on the chassis 6.

Of course, the strength of the thin (sheet metal) wall of the chassis 6 is much greater than that of the collars 21A, 21B, 21C, so that during the rupturing of the latter, the chassis 6 remains intact. It is thus preferable for the sheet metal to be sufficiently rigid for the breaking loads of the frangible elements according to this embodiment (as well as of the other embodiments described in the present text) to remain appreciably lower than that of the sheet metal: the sheet metal is thus prevented from deforming before these frangible elements break. The sheet metal can be rigidified as required, in particular by ribs. This therefore involves localized mechanical reinforcement.

Figure 4:
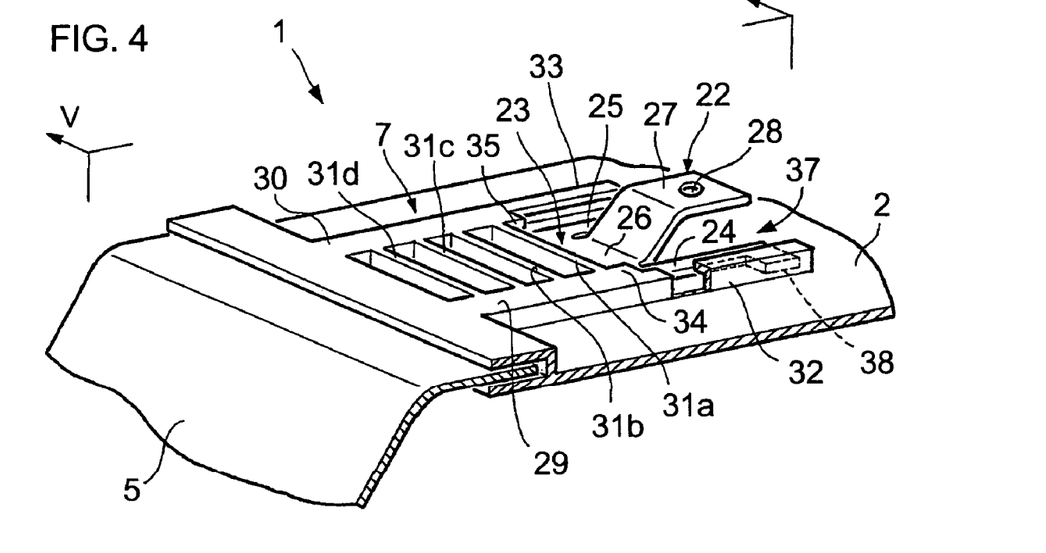
FIG. 4 is a perspective view, in partial section, illustrating a headlight furnished with frangible means of linking to a chassis, according to a second embodiment where these means comprise a row of stops that is extended by a runner in which is mounted a movable cleat capable of breaking the stops successively during an impact suffered by the headlight.
Figure 5:
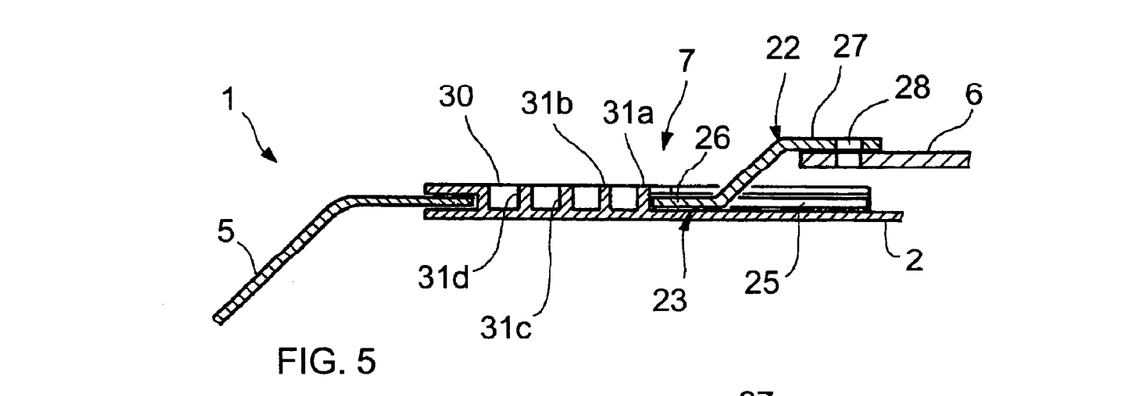
FIG. 5 is a sectional partial elevation view of the headlight of FIG. 4, along a sectional plane V—V.
Figure 6:
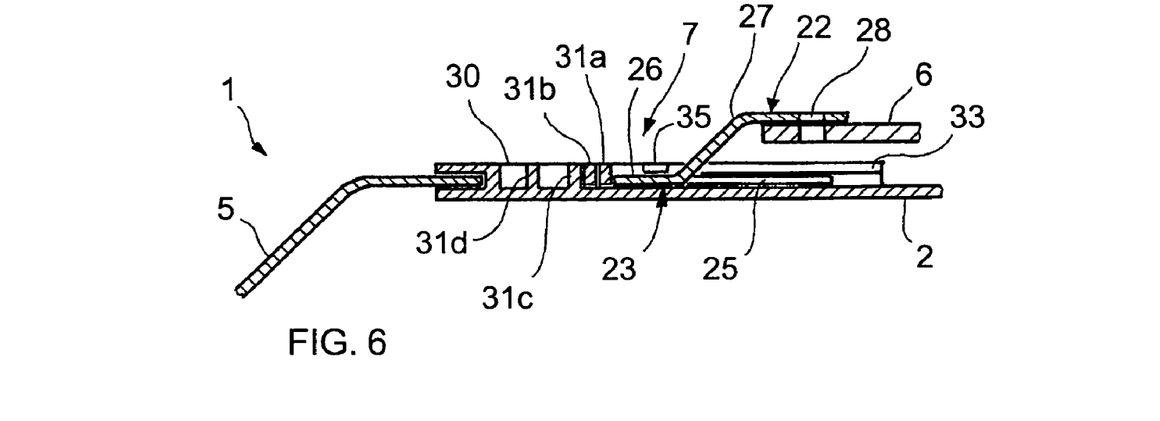
FIG. 6 is a view similar to FIG. 5, illustrating the headlight in the course of an impact [lacuna] the end of the movable cleat in the event of an impact and successively breaking the stops.

According to a second embodiment, illustrated in FIGS. 4 to 6, the headlight 1 comprises at least one, and for example two add-on cleats 22 for fixing the casing 2 to the chassis 6, and which are made by blanking and bending of sheet metal.

Each fixing cleat 22 comprises, on the one hand, a base part 23 via which it is mounted on the casing 2. This base 23 comprises two parallel branches 24, 25 joined by a core 26 which is perpendicular to them, so that the base 23 exhibits a U-shaped profile.

The fixing cleat 22 comprises, on the other hand, a cleat end 27 which, stretched between the branches 24, 25, connects to the core 26 and is elbowed so as to project with respect to the base 23, so that the fixing cleat 22 exhibits an h-shaped cross section.

The cleat 27 is fixed to the chassis 6 by means of a fixing screw which, passing through a hole 28 made in the cleat 27, engages with the chassis 6.

The casing 2 furthermore comprises two projecting longitudinal ribs 29, 30, linked by a row of parallel partitions 31a, 31b, 31c, 31d that run transversely at regular intervals. The ribs 29, 30 are extended, beyond the partitions 31a to 31d, by two parallel rails 32, 33 of reverse L-shaped cross section, as may be seen in FIG. 4 where one of the rails 32 is represented partially cut away.

At the junction of the rails 32, 33 and of the ribs 29, 30 are provided two set-backs 34, 35 forming dogs whose function will become apparent in what follows.

The rails 32, 33 jointly form a runner 36 into which the fixing cleat 22 is inserted longitudinally.

The runner 36 defines, jointly with the end partition 31a, that is to say the partition 31a adjoining the rails 32, 33, a housing 37 in which the cleat 22 is received, the branches 24, 25 of the latter each being furnished, at their opposite end from the core 26, with a laterally projecting lug 38 able to cooperate slidingly with a rail 32, 33, the holding of the cleat 22 on the casing 2 being supplemented by the dogs 34, 35 which cooperate slidingly with the branches 24, 25.

As long as the headlight 1 suffers no impact, the cleat 22 remains, substantially immobile, in its housing 37, with the core 28 applied against the end partition 31a which thus forms a stop for retaining the cleat 22.

This situation persists as long as the cleat 22 does not exert on the end partition 31a a bearing force greater than a predetermined threshold value, which depends on the thickness of the partition 31a.

During an impact suffered by the headlight 1, the casing 2 recoils under the pressure exerted by the obstacle while the cleat 22, secured to the chassis 6, tends to maintain its position.

If in the course of the impact the force exerted by the cleat 22 on the partition 31a—in reaction to the compressive force exerted by the casing 2—exceeds the predetermined threshold value, the core 26 bearing against the partition 31a causes the tearing thereof, this rupture absorbing part at least of the energy of the impact.

If the residual energy is sufficient, this situation reoccurs successively with the next partition or partitions 31a, 31b, 31c, 31d, against which the cleat 22 will abut, until the entire energy of the impact has been absorbed, or until all the partitions 31a, 31b, 31c, 31d have broken.

Thus the cleat 22, movable in the course of the impact, slides in the runner 36 with respect to the casing 2, in a discrete manner, that is to say in jerks. Stated otherwise, the casing 2 recoils in a discrete manner with respect to the chassis 6.

In the same manner as for the first embodiment described above, it is possible to regulate the energy absorption capabilities of the linking means 7 by varying the number of partitions 31a, 31b, 31c, 31d.

According to a third embodiment, illustrated in FIGS. 7 to 9 and 14 to 17, the linking means 7 comprise at least one and, for example two fixing members 39 capable of tearing under the effect of an impact suffered by the headlight 1.

Figure 7:
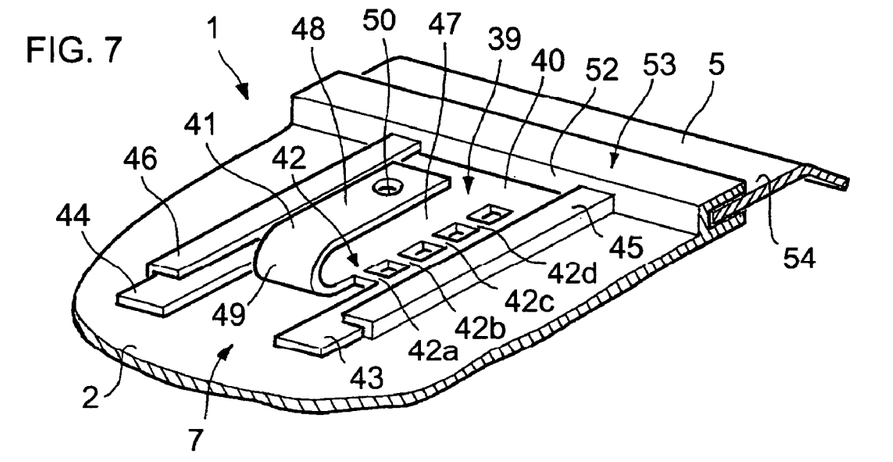
FIG. 7 is a perspective view, in partial section, illustrating a headlight furnished with frangible means of linking the casing of the headlight to a chassis, according to a third embodiment where these means comprise a tearable fixing member.

Each fixing member 39, which takes the form of a monoblock cleat made by blanking and bending of sheet metal, comprises a base part 40 fixed to the casing 2, as well as a cleat 41 for fixing to the chassis 2, which cleat 41 is connected to the base 40 by a series 42 of frangible bridges capable of breaking under the effect of a traction exerted by the base 40 or by the cleat 41.

As may be seen in FIG. 7, the base 40, substantially flat, comprises two parallel longitudinal wings 43, 44 which, to provide for the holding of the fixing piece 39 on the casing, cooperate respectively with two parallel rails 45, 46 projecting on the casing 2, each exhibiting a reverse L-shaped cross section.

The cleat 41 exhibits a U-shaped profile, and comprises two substantially parallel branches 47, 48. A first branch 47 of which runs longitudinally in the plane of the base 40 between the wings 43, 44 to which it is connected, on either side, by two parallel series 42 of frangible bridges 42a to 42d. The second branch 48 of which runs parallel and plumb with the first 47, to which it is connected by a curved core 49 which projects from the plane of the base 40 away from the casing 2.

This second branch 48 is drilled with a hole 50 for the passage of a screw which will engage in the chassis 6 so as to ensure the fixing of the cleat 22 to the latter.

Figure 8:
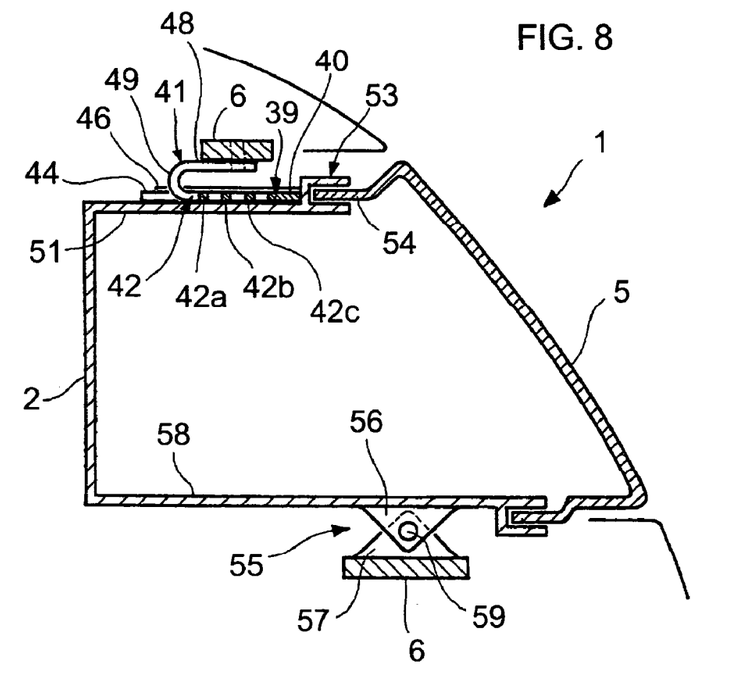
FIG. 8 is an elevation view in section of the headlight of FIG. 7.
Figure 9:
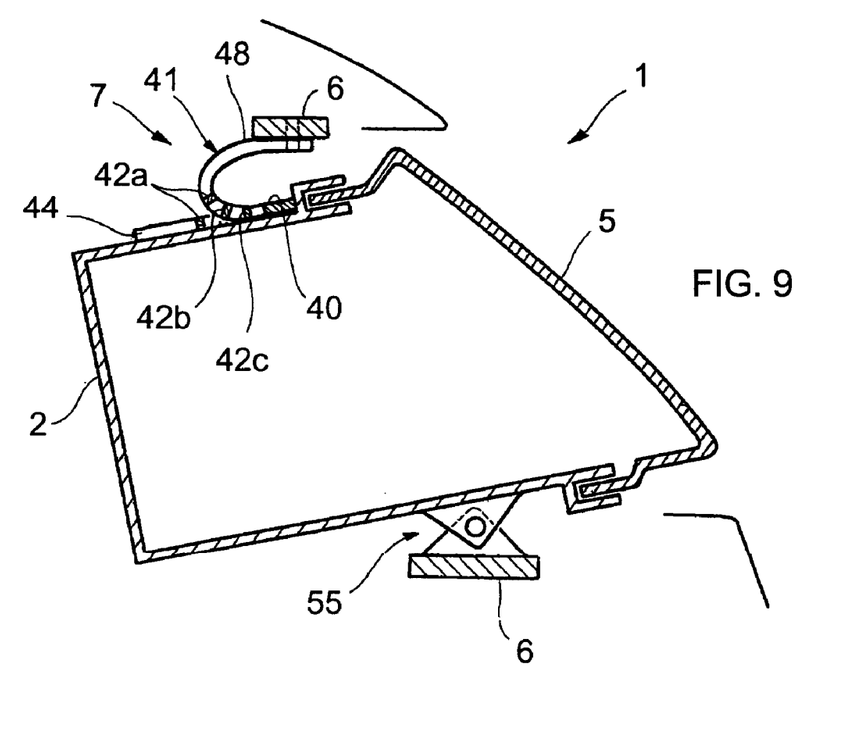
FIG. 9 is a view similar to FIG. 8, illustrating the headlight in the course of an impact causing the tearing of the member for fixing the casing to the chassis.

As may be seen in FIGS. 8 and 9, the fixing piece 39 is mounted on an upper wall 51 of the casing 2, the base 40 being received between the rails 45, 46 and abutting against a transverse halting surface 52 formed by a front edge 53 of the casing 2, shaped to receive by nested fitting a skirt 54 with which the glass shield 5 is provided.

As may also be seen in FIGS. 8 and 9, the casing 2 is mounted articulated on the chassis 6, on the opposite side to the fixing piece 39, by means of a pivot link 55 formed by two ribs 56, 57, one 56 of which is provided projecting on a lower wall 58 of the casing 2 and the other 57 of which projecting on the chassis 6, these ribs 55, 57 cooperating mutually with rotation by means of a transverse pin 59 which passes through them jointly.

As long as the headlight 1 suffers no impact, the fixing piece 39 keeps its integrity, ensuring rigid holding of the casing 2 on the chassis 6.

This situation persists as long as the traction force exerted on the frangible bridges 42a to 42d by the cleat 41 and the base 40, which tend to move away from one another, does not exceed a predetermined threshold value, which depends on the cross section of the frangible bridges 42a to 42d.

During an impact suffered by the headlight 1, the casing 2 recoils under the pressure exerted by the obstacle, tending to pivot about its articulation pin 59. Also, while the base 40 accompanies the casing 2 in the course of its motion, the cleat 41 remains attached to the chassis 6.

The first frangible bridges 42a break as soon as in the course of the impact the traction force exerted on them exceeds the predetermined threshold value, this rupture absorbing part at least of the energy of the impact (FIG. 9).

If the residual energy is sufficient, this situation reoccurs successively with the frangible bridges 42b to 42d, the cleat 41 detaching progressively from the base 40, until the entire energy of the impact has been absorbed, or else until all the frangible bridges 42a to 42d have broken.

Here again, the recoiling of the headlight 1 with respect to the chassis 6 takes place in a discrete manner.

The accurate guiding of the casing 2 with respect to the chassis 6, by means of the pivot link 55, makes it possible to uniformly distribute the traction force exerted on the two parallel series 42 of frangible bridges and to thus afford optimal absorption of the energy of the impact.

In the same manner as for the first two embodiments described hereinabove, it is possible to regulate the energy absorption capabilities of the linking means 7 by varying the number of frangible bridges 42a to 42d of the fixing member 39.

Moreover, in order for the piece 39 to fully afford its function, care will be taken to ensure that the breaking load of the casing 2 in the vicinity of the piece 39 is greater than the latter's breaking load. For example, the casing 2 can be reinforced in the zone of fixing of the piece 39 (for example by ribs on the internal or external wall of the casing, or by using a runner, also rigidified, also by ribs for example).

Furthermore, although, according to the embodiment just described, the headlight 1 is mounted pivotably about a pin situated under the headlight 1, it is possible to reverse the location of the fixing means 7 and of this rotation pin, so that the headlight 1 pivots in the other direction. These two mountings may be chosen in particular as a function of the height of the vehicle, so as to better damp the impact, especially in the case of a pedestrian impact.

Figure 14:
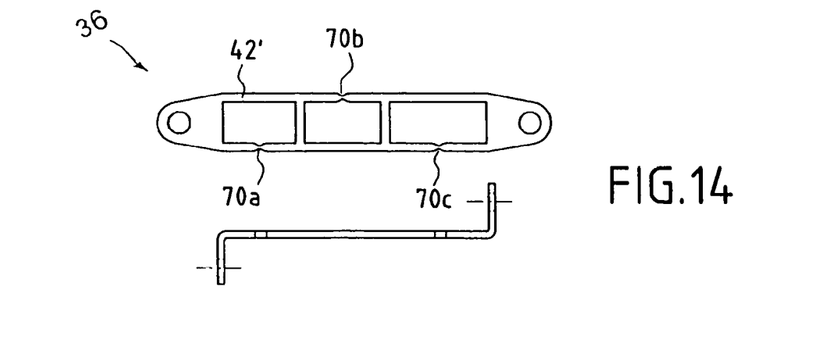
FIG. 14 is a view of a modified tearable linking cleat with a succession of frangible bridges, but the traction force thereon is exerted on one end without returning/unfurling motion of a part of the cleat.

FIG. 14 depicts a modified embodiment of the tearable linking cleat as described in FIG. 7: there is still a succession of frangible bridges 42a', 42d' but the traction force on this fixing cleat is exerted on one of its ends without the return/unfurling motion of a part of the cleat 41. These frangible bridges preferably comprise zones 70a,b,c of lesser cross section: these zones are the ones which will break one after another during the impact under the effect of the traction exerted by the recoil motion of the casing with respect to the chassis. One thus has a tearable cleat comprising a strip of material with wide chinks in its middle part, thus creating two parallel series of frangible bridges. The chinks may have various geometrical shapes, for example have a square, rectangular, circular, oval shape. These varied shapes may also be used in the cleats as represented in FIG. 7.

Figure 15:
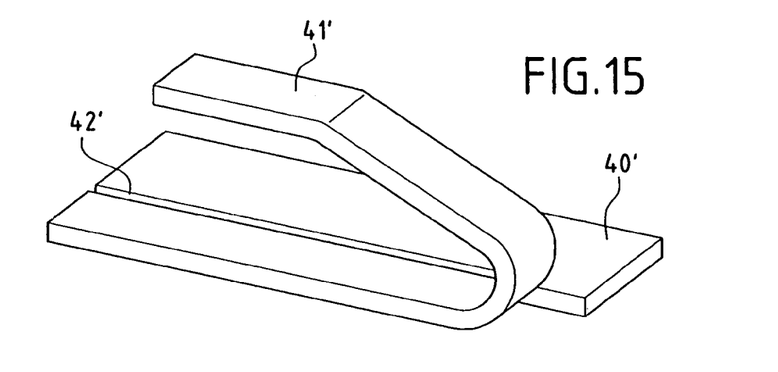
FIG. 15 is a view showing half of a modified tearable linking cleat that does not have any successively breaking frangible bridges, but instead progressively tears along two notches.

FIG. 15 depicts another modified embodiment of the tearable linking cleat as described in FIG. 7: the figure, for greater simplicity, represents only half of the tearable cleat, the complete cleat therefore also comprising another half of the part 41' and a part 40" symmetric with the part 40' with respect to the middle part 41'. In this embodiment, there are no longer any successively breaking frangible bridges, but a progressive tearing along two notches 42' (only one notch is represented, since only the longitudinal half of the cleat is represented). In the invention, the term "notch" is understood to mean a localized reduction in the thickness of the material along a line. The cross section of the cleat, along this line, therefore exhibits, for example, a thickness reduction in the shape of a V. The thickness is the zone of the notch (measured at the tip of the V, that is to say precisely where the thickness if least) may be regarded as around 10 to 80% of the thickness of the cleat, in particular between 30 and 60% of the thickness of the cleat. Of course, it is possible to choose a notch cross section which is not a V, but which is, for example a U or very rounded, or else has the form of a flat-bottomed groove.

Tests have been performed with a headlight for a Megane (manufacturer Renault) type vehicle, using previously described tearable cleats. The purpose of these measurements is to calculate a criterion described in the European draft directive on pedestrian impact No. 70/156/EEC, which criterion is termed the Head Impact Criterion or HIC. The mode of measurement is as follows: the headlight is attached to a fixed jig, which simulates the chassis of the car. An impacter is used, which is projected onto the headlight from a vertical drop well, the headlight being fixed on the jig at an appropriate angle defined in the directive, so that the impacter, when it is in contact with the headlight, hits it at an appropriate angle. The impacter simulates a child's head, i.e. a 3.5 kg sphere 165 mm in diameter, which comprises an internal accelerometer which will log the deceleration measurements. From this may be deduced a load curve and the HIC value can be determined. The smaller the HIC value, the better the protection for the pedestrian.

Trial No. 1

This is the control trial: the headlight was fixed on the jig with standard fixings, that is to say with the aid of fixing cleats screwed to the jig.

Trial No. 2

Figure 16:
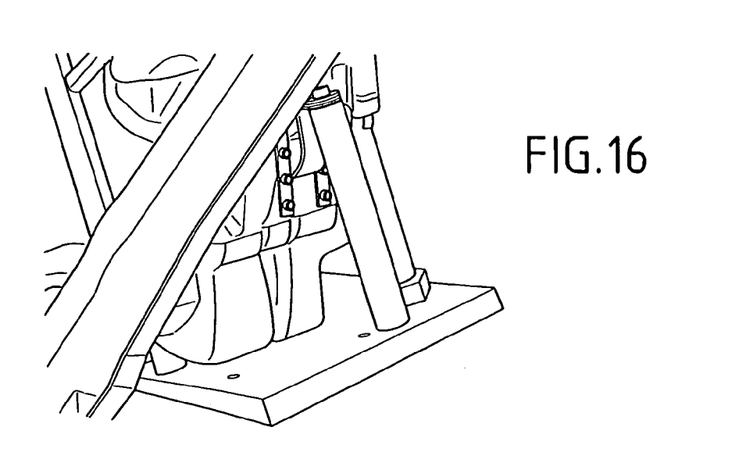
FIG. 16 is a perspective view illustrating the cleat after impact, the cleat being torn and all the frangible bridges having broken on the after the other.

This is a trial according to the invention: the headlight was fixed on the jig with a fixing cleat as represented in FIGS. 7, 8 and 9. Very slight modifications were made to the cleat of FIG. 7: the holes at the level of the frangible bridges are not of square cross section, but of circular cross section, the end of the part 48 is extended by a perpendicular additional wall which facilitates attachment by screwing, the parts 43, 44 are not fixed with the aid of rails but by screws distributed along their lengths. The cleat is made of stainless steel, its length is around 45 mm, the width of each "rail" 44, 43 is around 8 mm, the width of the folded-back middle part 41 is around 20 mm, and its radius of curvature at the level of the zone 49 is around 5 mm. The thickness of the cleat is around 1 mm. FIG. 16 is an illustration representing the cleat according to this trial after the impact, the cleat therefore being torn, all the frangible bridges having broken one after the other.

Trial No. 3

This is a trial according to the invention: the headlight was fixed to the jig with the aid of a notched cleat, by screwing, as for the cleat according to Trial No. 2, the cleat according to Trial No. 3 conforms to FIG. 15. The dimensions of the lateral parts and of the middle part are similar or identical to that of the cleat according to Trial No. 2. The notch has a V cross section and has a maximum depth of 0.5 mm, for a cleat thickness of 1 mm. The cleat is made of stainless steel like that of Trial No. 2.

Figure 17:
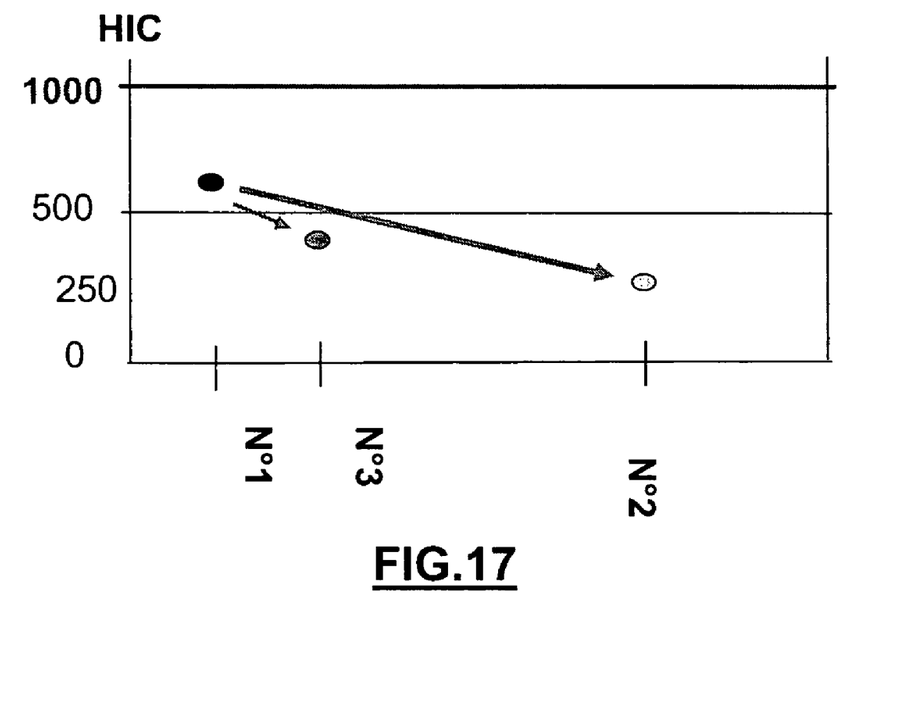
FIG. 17 illustrates the results of the trials in which HIC values are represented along the abscissa and the trial numbers are represented alone the ordinate.

The results of the trials are indicated in FIG. 17: represented as abscissa are the HIC values and as ordinate the trial Nos. It is noted that the tearable cleats according to the invention enable the HIC value of the control headlight simply screwed to the jig to be reduced by a third and even by half. In fact, the "starting" HIC value varies from one headlight to another, since it will depend on the geometry of the headlight and on its position, on its height once it has been mounted at the front of the vehicle. The invention makes it possible to reduce it by at least 20 to 30%, with whatever HIC value one starts with a conventional fixing, and without having to rethink the design of the headlight, this being very important from the industrial standpoint. This solution can also be used on vehicles already on the road, the aftermarket trade, without having to replace the entire headlight.

It should be noted that all the linking cleats which may break, tear and which are described above may be made of plastic or metal, for example stainless steel. They have the great advantage of making it possible to damp the impact for the pedestrian, allowing the headlight to recoil during the impact, without having to completely rethink the design of the headlight. Also, in the event of an impact, it may suffice to simply replace this cleat, instead of having to replace the entire headlight. It is possible to use one or more tearable cleats according to the invention per headlight. One generally suffices. In the case, in particular, of the tearable cleats having formed the subject of trials 2 and 3, it possible to fix the middle part on the headlight and "external" parts of the cleat on the jig/the chassis of the car also: there are three points of attachment, two on the headlight and one on the jig or vice versa.

Figure 10:
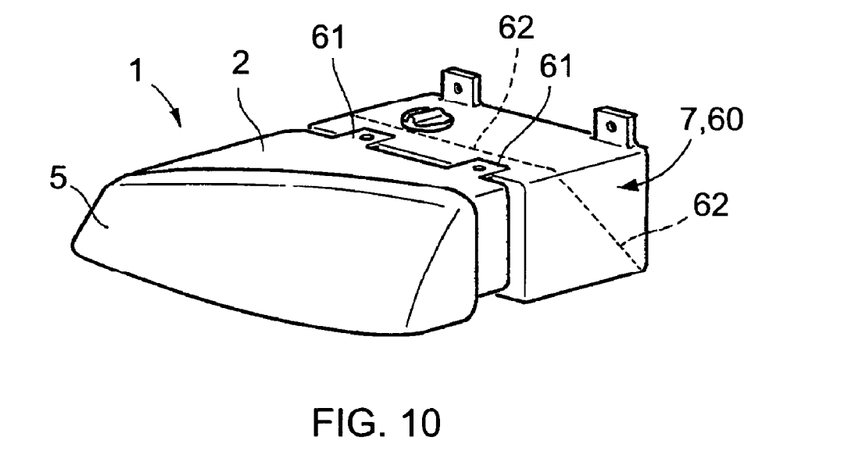
FIG. 10 is a perspective view illustrating a headlight mounted on the chassis of the vehicle by way of a functional member.

According to a fourth embodiment, illustrated in FIG. 10, the means 7 of linking the casing 2 to the chassis 6 comprise a functional member 60 of the vehicle. This member 60, on which the casing 2 is mounted, thus fulfills a supplementary function.

This member 60 is for example an air filter or a screen washer liquid reservoir, such as represented in FIG. 10. Such a member 60 has the advantage of possessing by construction a good capability of absorbing the energy of an impact by deforming, then by breaking.

The casing 2 of the headlight 1 is fixed directly to this member 60 by way of projecting cleats 61, the member 39 being in its turn fixed to the chassis 6 of the vehicle.

As may be seen in FIG. 10, the member 39 may be furnished with a prescored line 62 along which it breaks in a predetermined manner on account of the bearing of the casing 2 when the energy of the impact suffered by the headlight 1 is sufficient.

Figure 11:
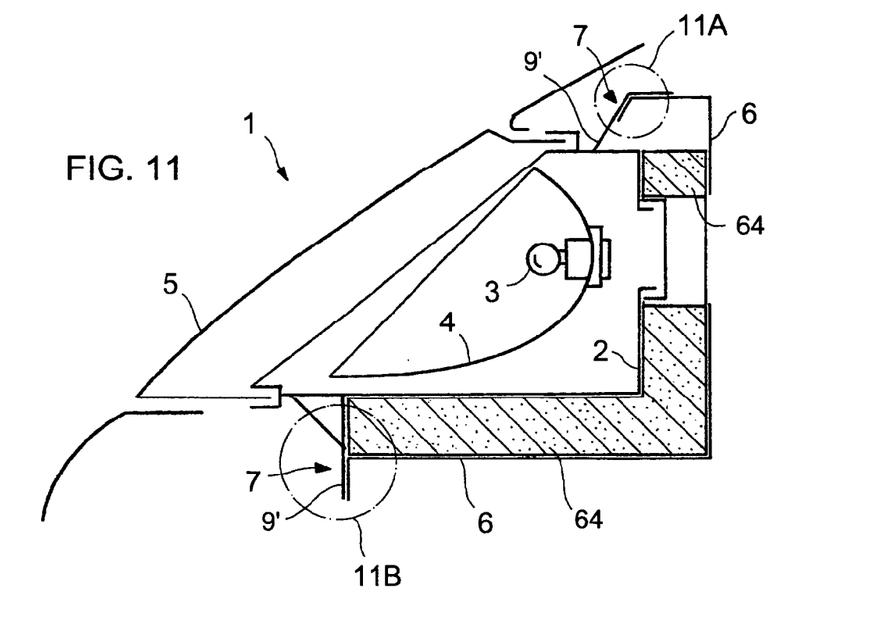
FIG. 11 is a sectional detail elevation view partially illustrating the motor vehicle headlight, furnished with frangible means of linking the casing of the headlight to a chassis, according to a fifth embodiment where these means comprise fixing cleats with rupture zones.
Figure 11A:
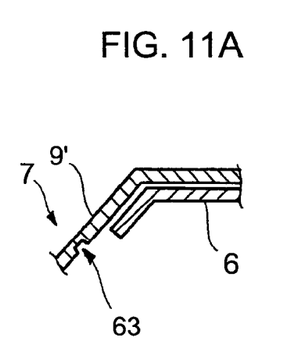
FIG. 11A is a sectional detail elevation view partially illustrating the headlight of FIG. 11, with fixing cleats with rupture zones—still in tact—interposed between the casing of the headlight and the chassis.
Figure 11B:
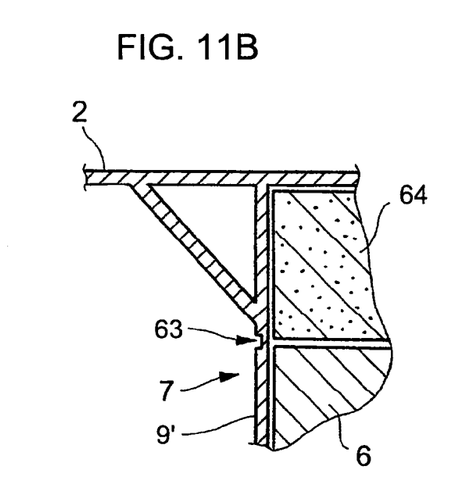
FIG. 11B is a sectional detail elevation view partially illustrating the headlight of FIG. 11, with fixing cleats with rupture zones—still in tact—is interposed between the casing of the headlight and the chassis, and also utilizing an energy absorbing compressible element or elements.
Figure 12:
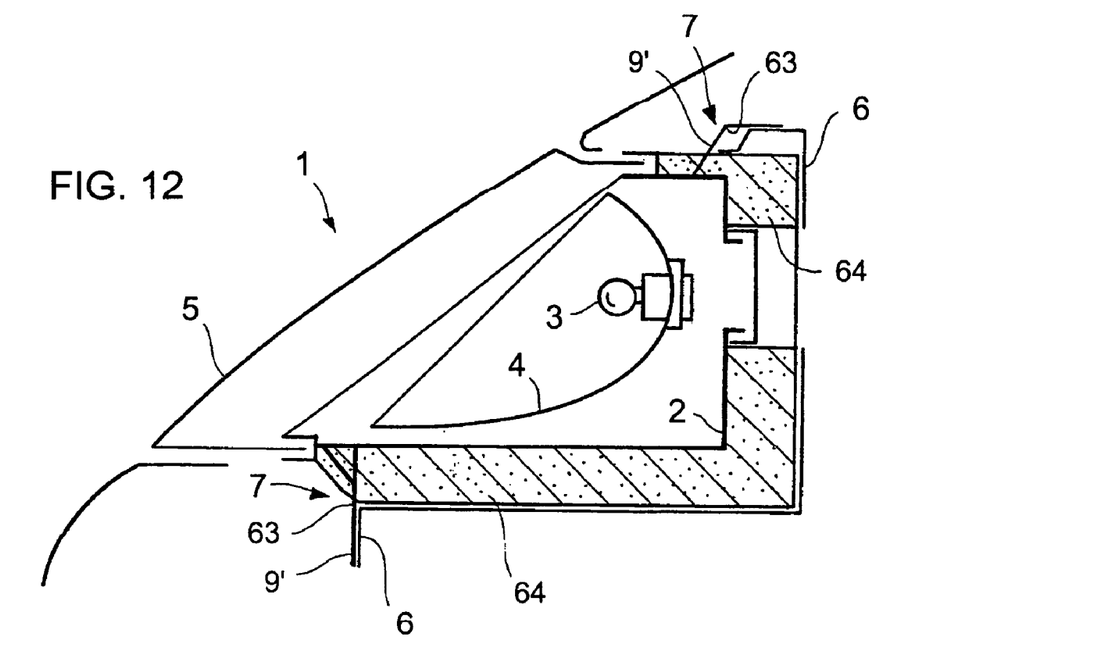
FIG. 12 is a view similar to FIG. 11, illustrating the fixing cleats embedded in the compressible member enhancing rigidity and allowing localized stress in the rupture zones.
Figure 13:
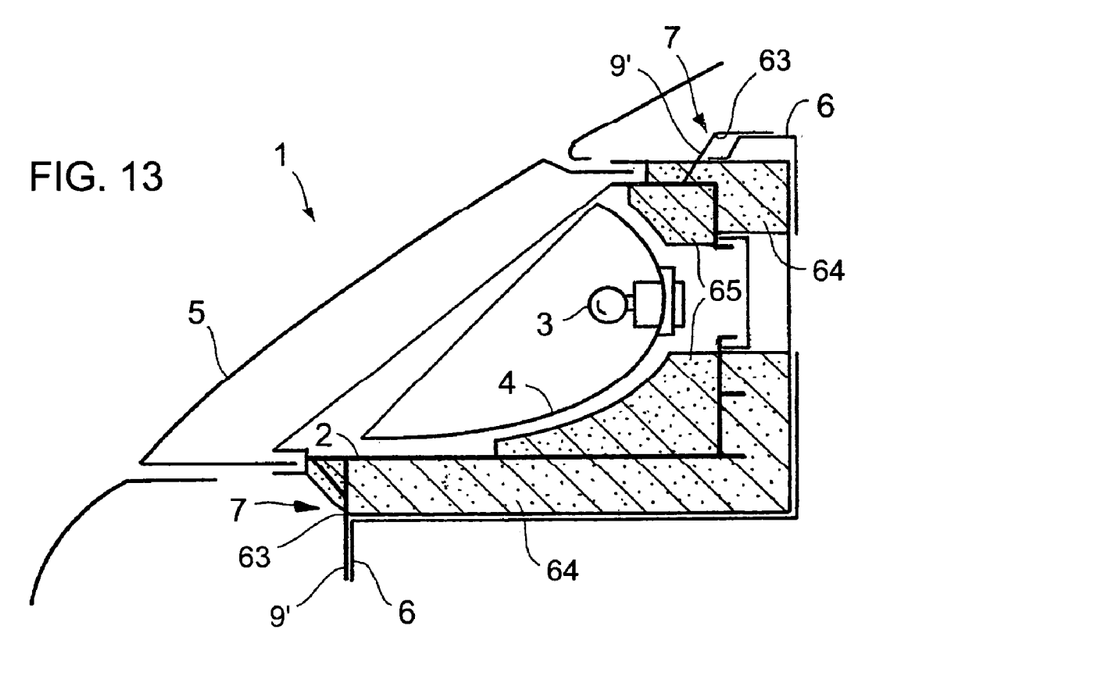
FIG. 13 is a view similar to FIG. 11, illustrating the compressible member encroaching on the internal volume of the motor vehicle headlight.

According to a fifth embodiment, of which three variants are illustrated in FIGS. 11, 12 and 13 respectively, the linking means 7 comprise fixing cleats 9' by means of which the headlight 1 is mounted directly on the chassis 6, these cleats 9' being furnished with predetermined rupture zones 63.

The fixing cleats 9' take the form in this instance of grooves made in the cleats 9' and that are capable of breaking during a frontal impact of sufficient intensity suffered by the headlight 1.

By breaking, the rupture zones 63 absorb part at least of the energy of the impact.

Of course, it is possible to vary the cross section and/or the depth of the grooves 63 so as to consequently adjust their capabilities of absorbing the energy of the impact.

When the impact is of greater intensity than the absorption capabilities of the rupture zones 63, it may however be necessary to absorb at least part of the residual energy.

This is why a compressible member 64 is, moreover, interposed between the casing 2 and the chassis 6. Here, this is a block of foam (in one or more parts) that covers all or part of the faces of the casing 2 which are opposite the chassis 6, as is represented in FIG. 11. In this variant, there is therefore only a (small) part of the energy of the impact which is absorbed by the frangible fixing cleats, the remainder of the energy being absorbed by the compressible element or elements.

The compressible member 64 is, preferably, made from a polyurethane foam. Polyurethane foams of the type marketed by the company BAYER under the brand name BAYFILL® or under the reference PU 62 IF 70, with a density of 66 kg/m³ for example, or by the company DOW under the brand name STRANDFOAM®, with a density of 44 kg/m³ for example, may be suitable. It is also possible to use metal (aluminum) foams.

Thus, even during a violent impact in the course of which the cleats 9', having broken, were unable to absorb the entire energy of the impact, the member 64 will supplement this absorption of energy, notably limiting the bodily damage suffered by a pedestrian when the latter is the victim of the impact.

In accordance with the first variant, and as is represented in FIG. 11, the compressible member 64 may be added on. However, in accordance with the second and third variants, illustrated in FIGS. 12 and 13 respectively, the compressible member 64 may be overmolded over the casing 2.

According to the second variant, the fixing cleats 9' are even embedded in the compressible member 64, thereby enhancing their rigidity in the vicinity of the casing 2 and allowing the stress to be localized in the rupture zones 63.

According to the third variant, the compressible member 64 even encroaches on the internal volume of the headlight 1. More precisely, it exhibits a portion 65 which runs between the casing 2 and the reflector 4 (in particular against the rear face of the casing and possibly all or part of its lateral faces). Thus, in the event of an impact, the compressible member 64 damps the recoil of the casing 2, but, when the impact is sufficiently violent or sufficiently localized to cause the depression of the reflector 4, the compressible member 64 also damps the recoil of the latter. Thus, whatever embodiment is chosen, the layout of the linking means 7 ensures a good capability for absorbing the energy of an impact suffered by the headlight 1 while limiting the bulkiness of the latter, so that the compactness demands of motor vehicle manufacturers are satisfied.

This foam-like compressible element can also be introduced into just the interior of the headlight.

Moreover, the headlight 1 meets the demanding standards as regards passive safety, to the benefit of the safety of pedestrians whose risks of serious injuries are greatly lessened, without however requiring a thorough revision of its general design, the linking means described hereinabove being easily graftable onto a conventional headlight.

Moreover, when the impact suffered by the headlight 1 damages only the linking means 7, the other components of the headlight 1 being left intact, it suffices to replace the linking means 7 without it being necessary to operate on the other components, thereby limiting the operations on the headlight 1 and thus reducing the repair costs.

The invention applies thus to any vehicle equipped with such headlights, which is able to best protect pedestrians in the event of an impact, and in particular is capable of fulfilling the conditions described in European draft directive No. 70/156/EEC relating to pedestrian impact.

What is claimed is:

1. A support for linking a motor vehicle headlight to a chassis of a motor vehicle, the support comprising:
   a plurality of successive frangible elements for absorbing energy by one or more of said plurality of successive frangible elements breaking in succession during one or more impacts to the headlight when the support is supporting a motor vehicle headlight to a chassis of a motor vehicle and the headlight suffers an impact.

2. A motor vehicle headlight comprising:
   a casing enclosing at least one light source;
   a support for linking said casing to a chassis of a motor vehicle, said support including a plurality of successive frangible elements for absorbing energy by one or more of said plurality of successive frangible elements breaking in succession during one or more impacts to the headlight when said casing is linked to a chassis of a motor vehicle.

3. A motor vehicle headlight, which comprises a casing enclosing at least one light source and fixed on a chassis, which headlight comprises frangible means of linking the casing to the chassis, which are able to absorb in the course of their rupture at least part of the energy of an impact suffered by the headlight,
   wherein the linking means comprises a succession of predetermined rupture zones capable of breaking successively during an impact suffered by the headlight.

4. The headlight as claimed in claim 1, wherein the linking means comprise a brace interposed between the casing and the chassis, furnished with a series of collars capable of breaking successively as a result of the bearing of the casing.

5. The headlight as claimed in claim 4, wherein the length of the portion with collars of the brace is between 20 and 150 mm.

6. The headlight as claimed in claim 4, wherein the length of the portion with collars of the brace is between 20 and 50 mm.

7. The headlight as claimed in claim 5, wherein the length of the portion with collars of the brace is between 20 and 50 mm.

8. The headlight as claimed in claim 1, wherein the linking means comprise a fixing member able to tear under the effect of an impact suffered by the headlight.

9. The headlight as claimed in claim 8, wherein the fixing member comprises a series of zones able to tear successively during an impact suffered by the headlight.

10. The headlight as claimed in claim 8, wherein the fixing member comprises a zone able to tear progressively during an impact suffered by the headlight.

11. The headlight as claimed in claim 8, wherein the fixing member comprises two parts fixed respectively to the casing and to the chassis, the parts being connected by at least one series of frangible bridges capable of breaking under the effects of a traction exerted on at least one of the parts.

12. The headlight as claimed in claim 11, wherein the two parts are connected by two parallel series of frangible bridges.

13. The headlight as claimed in claim 11, wherein the frangible bridges have less mechanical strength locally due to a reduction in their cross section.

14. The headlight as claimed in claim 11, wherein the casing comprises means for guiding its own displacement with respect to the chassis during the rupture of the frangible bridges or the tearing along the notch or notches.

15. The headlight as claimed in claim 14, wherein the guiding means form a pivot link between the casing and the chassis.

16. The headlight as claimed in claim 10, wherein the fixing member comprises at least two parts fixed respectively to the casing and to the chassis, the parts being delimited by a notch over all or part of their length, said notch guiding the tearing between the two parts under the effect of a traction exerted on one of said parts.

17. The headlight as claimed in claim 16, wherein the fixing member comprises three adjacent parts, the middle part being delimited with respect to the other two by a notch.

18. The headlight as claimed in claim 16, wherein the functional member is an air filter.

19. The headlight as claimed in claim 16, wherein the functional member as a screen washer liquid reservoir.

20. The headlight as claimed in claim 1, wherein the linking means comprise a functional member of the vehicle.

21. The headlight as claimed in claim 1, wherein the frangible means absorb only part of the energy of the impact suffered by the headlight, and wherein they are associated with at least one compressible element of the foam type.

22. A motor vehicle headlight, which comprises a casing enclosing at least one light source and fixed on a chassis, which headlight comprises a frangible means of linking the casing to the chassis, which are able to absorb in the course of their rupture at least part of the energy of an impact suffered by the headlight, and wherein the linking means comprise a succession of predetermined rupture zones capable of breaking successively during an impact suffered by the headlight the casing is reinforced in the vicinity of said rupture zones and wherein the linking means comprise, on the one hand, a cleat mounted movably in a runner and, on the other hand, a row of stops able to be broken successively by the cleat during an impact suffered by the headlight.

23. The headlight as claimed in claim 22, wherein the cleat is carried by the chassis, and wherein the runner and the stops are carried by the casing.

24. The headlight as claimed in claim 23, wherein the stops are formed by partitions projecting from the casing.

25. The headlight as claimed in claim 23, wherein the cleat is an add-on piece.

* * * * *